Dec. 8, 1959  E. A. HERIDER ET AL  2,916,083
SEAT SUPPORT
Filed June 16, 1955  3 Sheets-Sheet 1

INVENTORS
Elmer A. Herider
Jimmie James
BY
Webb, Mackey & Burden
THEIR ATTORNEYS.

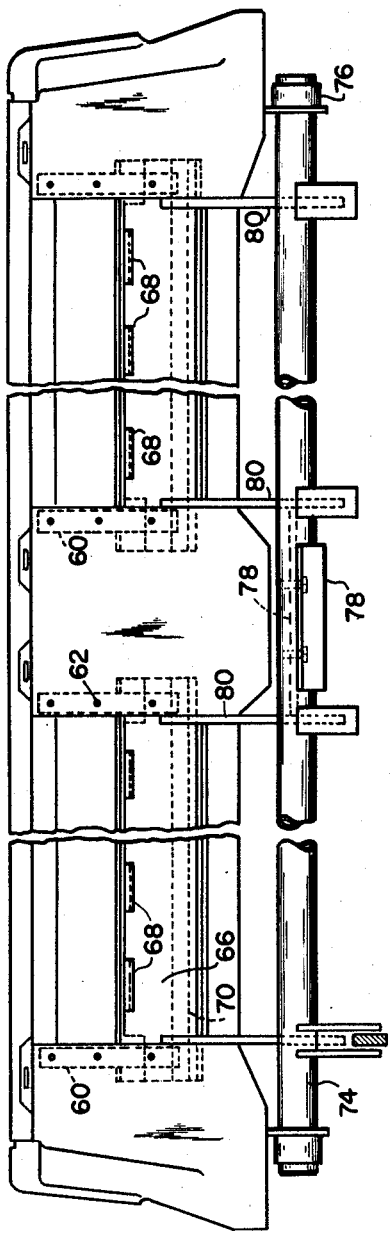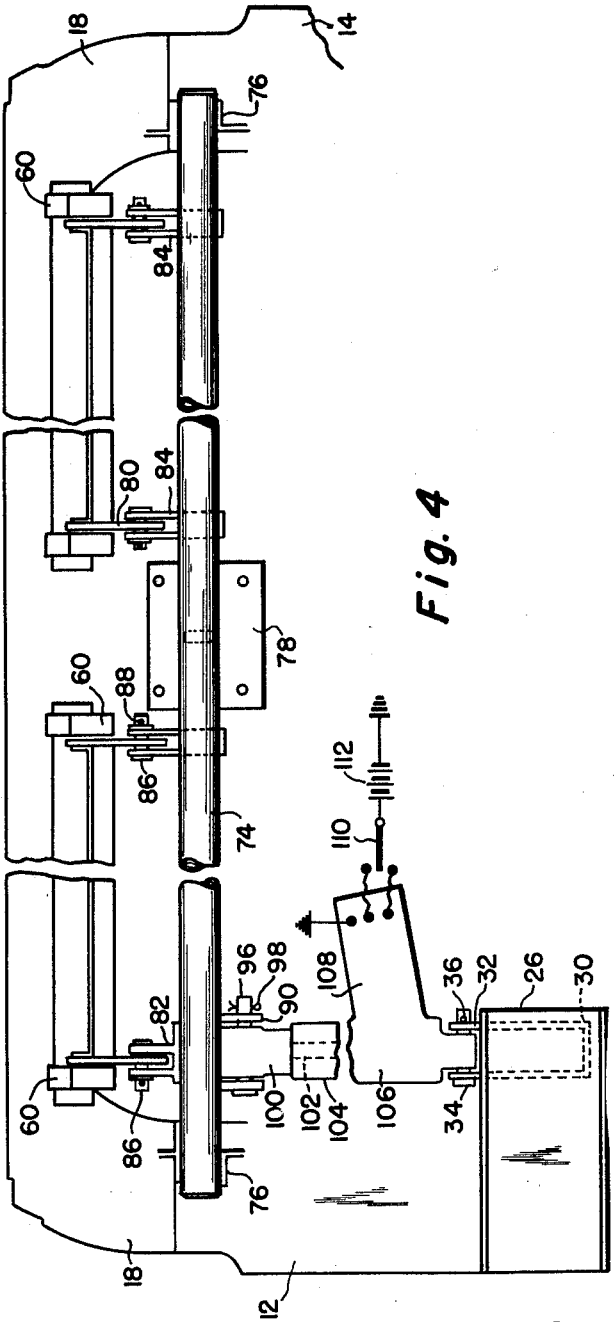

United States Patent Office 2,916,083
Patented Dec. 8, 1959

2,916,083
SEAT SUPPORT

Elmer A. Herider, Dearborn Township, Wayne County, and Jimmie James, Detroit, Mich., assignors to Rockwell-Standard Corporation, a corporation of Pennsylvania Application June 16, 1955, Serial No. 515,842

7 Claims. (Cl. 155—88)

This invention relates to a seat support operable to move the actual seating surface of a seat supported thereon in an up and down fashion whereby one edge of the seating surface adjustably swings in a vertical sense about another edge as a center, thus effectively raising and lowering the adjusted height of the seat. As presently disclosed, the invention is shown embodied in a vehicle type seat structure in which the weight of the occupant of the seat is concentrated closer to one particular edge than to an edge opposite thereto, and this one particular edge referred to is preferably the swingably adjustable edge, whereas the opposite edge defines the swing center about which the adjustment is made.

Various features, objects and advantages of the invention will either be specifically pointed out or become apparent when, for a better understanding of the invention, reference is made to the following description taken in conjunction with the accompanying drawings in which:

Figures 3 and 4 are respective front sectional elevation and top plan views of the adjustable seat of Figure 1 taken along the respective lines III—III and IV—IV.

Figure 1:
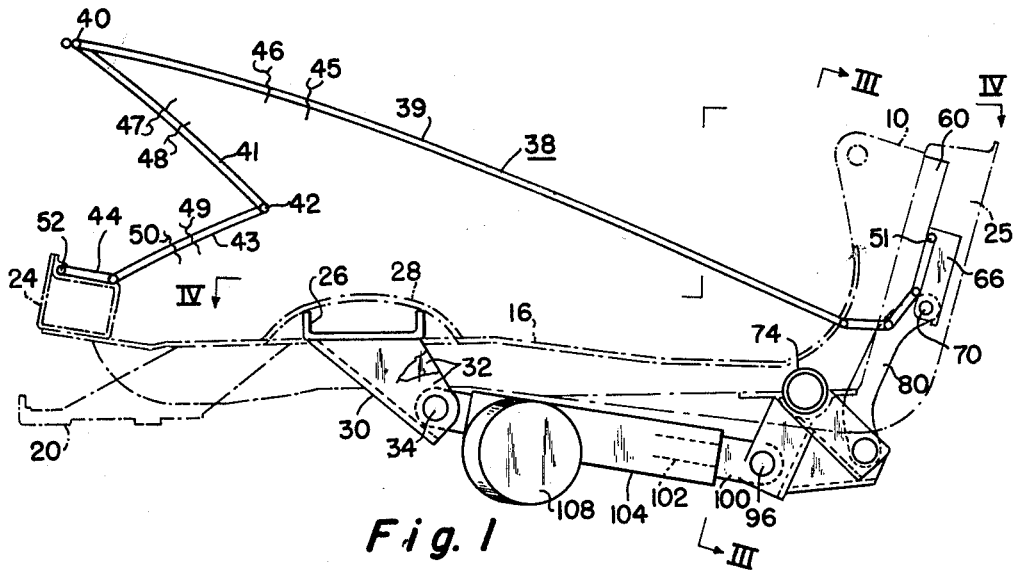
Figures 1 and 2 are transverse sections in elevation through the same adjustable seat structure embodying the invention but disposed in different positions of adjustment.

Referring more particularly to the accompanying drawings, a center seat back support 10 is shown which is attached rigidly to the cushion frame to support a back rest structure (not shown) and which comprises a plurality of longitudinal frames, two of which are right and left side frames respectively at 12 and 14, and having bushings therein, plus a center longitudinal frame 16 intermediate the two side frames and having bushings at its opposite sides which are each complemental to the bushings in the side frames 12 and 14 at that side. The opposite side frames 12 and 14 together support a rear cross member 25 and a front cross member 24, and each side frame includes a depending foot bracket at the rear at 18 and a front foot bracket at 20, both brackets of which are adapted to be slidably mounted to a set of generally fore and aft extending seat trackways, not shown, but conventionally arranged to be made fast to a floor pan or platform as in an automotive vehicle. The side frames 12 and 14 and the intermediate frame 16 form the bottom of a rectangular seat cushion receiving recess which is closed off at the front and rear, respectively, by means of the front cross member 24 of box beam construction and the rear cross member 25 of a rectangular construction of considerably greater beam depth than thickness.

A short channel shaped member 26 is provided which is secured, by means of welding or otherwise, to the topside of side frame 12 and a downwardly and rearwardly depending bracket 30 of general U-shape in cross-section is secured, by welding or otherwise, to the base of the channel member 26. The depending bracket 30 has a pair of opposite leg portions 32 which are spaced apart from one another and joined to the common base of the bracket which extends rearwardly and downwardly from the channel member 26, as noted, at approximately a 45-degree angle. The opposite legs 32 of the bracket 30 are provided with registering apertures and receive therein a pivot pin 34 having an enlarged head at one end and being provided with a cotter pin fastener 36 for retaining the same in place at the opposite end.

A seat cushion structure for reception in the seat support is provided comprising a plurality or set of transversely spaced apart spring elements 38 which are supported by the seat support. Each spring element 38 has a seating portion 39 intermediate its ends. At the front of the seating portion, the element is bent at 40 to form a downwardly and rearwardly extending leg 41. The element is bent at 42 to form a downwardly and forwardly extending leg 43 having a hooked end portion 44 for anchoring the element at its front end. In Figure 1, a part of this seating portion 39 and parts of the legs 41 and 43 of a spring element in the foreground have been broken away, as indicated at 45, 46, 47, 48, 49, and 50, to show corresponding parts of the spring wire elements 38 located in the background. A border wire is indicated at, but immediately forwardly of, the junction 40 between the portions 39, 41 of the wire elements 38 and is arranged in generally known fashion to extend about the front margin and two adjacent sides of a wire mesh type seat cushion framework formed by the zigzag wire elements 38 just considered.

At one end, the rear end, the zigzag wire spring elements 38 each have attachment portions formed with an integral anchoring hook 51 similar to the front anchoring hooks 44 already considered which are anchored in a plurality of axially spaced apart capsules 52 secured to the box-like front cross member 24. The zigzag spring portions 39, 41, 43 cooperate in well-known manner to elastically support the seating surface under load, the border wire area at 40 swinging in a vertical arc as the seating surface conforms to the load.

Figure 5:
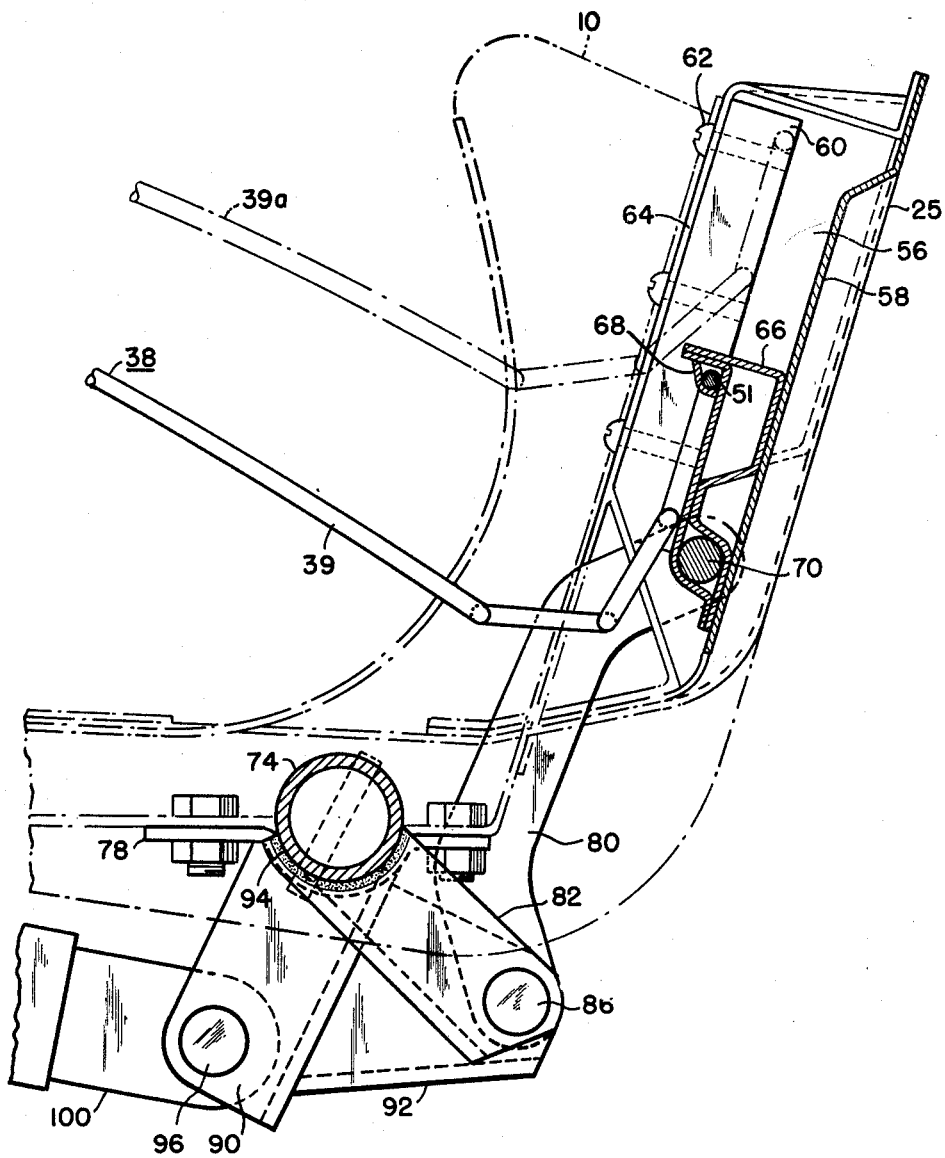
Figure 5 is a fragmentary enlarged view of a portion of the adjusting structure of Figure 1.

At the forward end of the seat support framework, the front cross member 24 is appropriately welded at its ends to the opposite side frames 12 and 14 at their extremities. The rear cross member 25 is welded or otherwise secured to the rear extremities of side frames 12 and 14, and the center longitudinal frame 16, respectively. The right and left sides of rear cross member 25 are symmetrically identical to one another for the purposes explained hereinafter and, in the interests of brevity, only the right side of rear cross member 25, Figure 5, will be described in detail. The rear cross member 25 defines an inwardly opening guideway or channel 56 which at its rear side is closed off by an inwardly deflected and slightly inclined planar portion 58 of the seat frame rear cross member 25. The guideway 56 is closed off at its forward end by means of a rectangularly shaped strip of wood 60 which may be generally square in cross section and formed of lignum vitae, for instance. The strip of lignum vitae may be secured as by means of a set of wood screws 62, to a front face member 64 that is spot-welded, or otherwise secured to the cross member 25 extending transversely inwardly of the seat framework.

An identical piece of lignum vitae 60 serving the same guideway function is located in the left side of front face member 64 and similar guideways employing identical pieces of lignum vitae as at 60 are provided at the opposite sides of the intermediate frame member 16 on the front face member 64. The rear cross member 25 of the support framework contains a spaced apart pair of longitudinally aligned movable cross members 66, the opposite ends of which are received in the companion sets of guideways defined respectively by means of the planar portion 58 of the seat frame rear cross member 25 and the rectangularly shaped strip of wood 60.

In the interests of brevity, only the movable cross member 66 adjacent the right side of the rear cross member 25 will be specifically described in the immediately following remarks. The movable frame or crosshead member 66 has its rear surface arranged to slide upon the rearwardly inclined planar portion 58 of the stationary rear cross member 25 and the opposite ends of the movable cross member 66 are received in and guided by the guideway 56, of which the front end is closed off by the respective pieces of lignum vitae 60, Figure 3. A plurality of axially spaced apart sheet metal loops 68 is secured to the movable cross member 66 which may be a composite box structure formed of two pieces of sheet metal. The loops 68 receive therein and anchor the upwardly extending hooked ends 51 on the rear attachment portion of the zigzag spring wire elements 38 which are disposed in a row to present a generally horizontal reticulated surface which is limitedly deformable and of well-known construction.

The two sheet metal pieces forming the cross member 66 are separated at their lower portions to define a transversely extending cavity in which a rod 70 is received, the ends of which are co-terminal with cross member 66. The rod 70 and the cross member 66 are slidable generally up and down within the stationary cross member 25 in the fashion of a crosshead with coordinated movement due to their connection to a common rockshaft 74 as follows. The rockshaft 74 is journaled in opposite end bearings as at 76 mounted in the respective side frames 12 and 14 and is further journaled in a pair of split bearing type half bearing brackets as at 78 secured together and bolted to the bottom of the center longitudinal frame 16. A set of C-shaped flat links 80 is provided to connect the two rods 70 and sets of bifurcated brackets 84 which are welded or otherwise secured fast to the rockshaft 74.

A bifurcated portion 82 of a bell crank forms a fourth bracket similar in function to the preceding brackets 84 which are three in number. The C-shaped links 80, preferably four in number, are apertured at their upper ends and receive within the aperture an end portion of the sliding track rods 70. The lower ends of the C-shaped links 80 are similarly apertured and pivotally receive therein a pivot pin 86 which is supported in apertures in the bifurcated brackets 84 or the bracket portion 82 and retained therein, as by means of a suitable washer and cotter pin 88. The bell crank formed in part by the referred to bifurcated bracket portion 82 is a composite sheet metal member having another bifurcated portion 90 and may assume a general triangular shape by reason of having a pair of bridging members 92 which secure together the outer extremities of the bifurcated portions 82 and 90. The inner portions of the latter are welded or otherwise secured fast at 94 to the rockshaft 74 for conjoint rotation therewith. The bifurcated portion 90 of the bell crank has a pair of aligned apertures located at one apex of the triangular configuration of the bell crank, and these apertures receive a pivot pin 96 having an enlarged head at one end and being retained in the apertures, as by means of a cotter pin 98.

Means as follows is provided for rocking the rockshaft 74 so as to force the C-shaped links 80 and the crossmember rods 70 upwardly and downwardly relative to the stationary seat support cross member 25, thereby to adjust the reticulated seating surface formed by the portions 39 of zigzag wire elements 38.

A pair of relatively rotatable threaded members 100 and 102 disposed in threadably engaged telescoping relationship is arranged with the outer end of one of the members apertured for receiving the pivot pin 96 carried by the bell crank and with the outer end of the other aperture to receive the pivot pin 34 stationarily carried by the depending bracket 30. A dust sleeve 104 may be disposed concentrically about the threaded members 100 and 102 for covering their threads as they are relatively rotated with respect to one another to foreshorten and extend their opposite ends, thus moving the pivot 96 toward and from the stationary pivot 34. Relative rotation of one of the members, preferably the inner member 102, is accomplished by means of a reduction gear box 106 and a double-wound electric motor 108 drivingly connected to the inner member 102 through the gear box 106.

The members 100 and 102 and the motor 108 may be of the form generally shown in U.S. Patent No. 2,641,468, in which the double-wound rotor of the motor 108 is supplied with electric current through a double throw switch 110 connected to a negative grounded battery 112. In known fashion, one winding of the double wound motor rotor drives the motor in one direction when energized, and the other winding drives the motor in an opposite sense when energized. The switch 110 is manually controlled for selecting at will the direction of motor rotation and, consequently, the direction of approach or separation of the pivot pin 96 from the stationary pivot pin 36.

The horizontally extending reticulate load carrying surface provided by the zigzag wire elements 38 occupies substantially a single, elastically, but limitedly deformable plane and, in known fashion, is adapted to be padded with a layer of foam rubber (not shown) and covered with appropriate seat cloth (not shown).

In one physically constructed embodiment of the invention for automotive use, the design point for the concentration of weight of the automobile occupant when seated was located approximately two and one-half inches closer to the guideway track 56 than to the edge wire at 40 of the seat and the designed vertical travel at this point of load supporting concentration was one inch and one-half.

Figure 2:
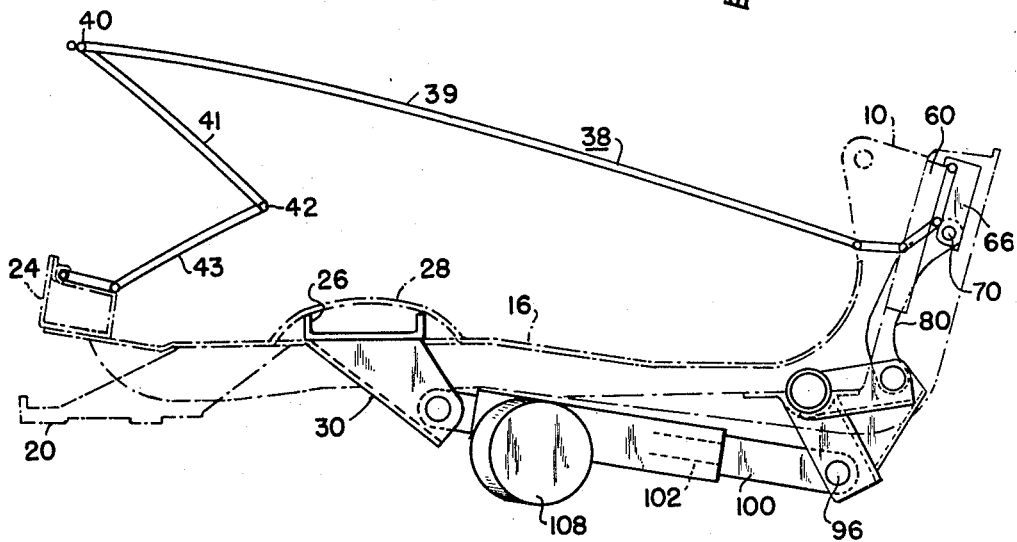

In operation, the seat adjusting motor 108 is appropriately controlled through the manual selector switch 110 to force the bell crank carried pivot pin 96 toward and away from the fixed pivot 34, thereby rotating the bell crank and the rockshaft 74 in counterclockwise and clockwise directions, as viewed in Figures 1 and 2. Figure 1 shows the threaded elements 100 and 102 in their minimum foreshortened position in which the moving cross member 66 in the stationary cross member 25 is in its lowermost position, thus adjusting the seating surface portions 39 provided by the zigzag elements 38 to their lowermost adjusted position.

The motor 108 is susceptive of an infinite number of incremental changes in adjusting the seat from the lowermost position. The maximum height position of the seating surface is shown in Figure 2, in which the threaded members 100 and 102 are in their maximum extended position. When the switch 110 is in a neutral position, neither side of the seat adjusting motor 108 is energized and the motor and adjustable seat are idle. Appropriate positioning of the switch 110 and reversal of the motor will restore the seating surface portions from the dotted line position 39a, Figure 5, to any intermediate position or to the lowermost position for the row of wire seating elements shown by the solid lines 39 in Figure 5. The seating surface movement accompanying this changing of positions is a tilting or canting movement essentially about the elastically supported border wire area 40 as a center, wherein the seating surface swings vertically thereabout when the elevation of the wire anchoring loops 68 is changed due to operation of the seat adjusting motor 108.

While we have described certain presently preferred embodiments of our invention, it is to be understood that it may be otherwise embodied within the scope of the following claims.

We claim:

1. A seat construction having a plurality of parallel spring strip elements providing a load carrying supported surface and supporting structure therefor comprising a framework, opposite sets of yieldable attachment portions joined to the strip elements with one set having a V-shaped configuration elastically connecting the framework and one edge of the supported surface for elastically cushioned up and down movement of the latter, a cross member supported with a sliding guide fit in means on said framework to assume different vertically spaced positions and connected to the other attachment portions for the strip elements at the opposite edge of the supported surface for adjustably supporting the same in corresponding positions, a cross shaft mounted in said framework for rotative movement about a fixed transverse axis therein, lift links forming separate connections between the cross shaft and each end of said cross member for holding same in the adjustment desired in its guide means dependent on the rotative position of the cross shaft, powered means for extensibly and retractively moving to adjust the shaft into desired stationary rotative positions and connected between the latter and a fixed point in said support structure, and power delivery means for applying power to operate said shaft for raising and lowering said cross member as above described in its guide means.

2. A seat support having a plurality of parallel spring strip elements providing a load carrying supported surface, and each having end portions thereof inclined relative to said surface, one set of end portions being inwardly inclined for providing a V-shaped formation elastically connecting the support and one edge of the supported surface for elastically cushioned up and down movement of the latter, and a cross member supported with a sliding guided fit in means on said support to assume different vertically spaced positions and connected to another set of end portions at the opposite edge of the supported surface for adjustably supporting the same in corresponding positions, a cross shaft mounted in said framework for rotative movement about a fixed transverse axis therein, lift links forming separate connections between the cross shaft and each end of said cross member for holding same in the adjustment desired in its guide means dependent on the rotative position of the cross shaft, powered means for extensibly and retractively moving to adjust the shaft into desired stationary rotative positions and connected between the latter and a fixed point in said support structure, and power delivery means for applying power to operate said shaft for raising and lowering said cross member as above described in its guide means.

3. In combination, a plurality of transversely aligned support frames defining generally vertically disposed guideways, a cross member slidably received in companion ones of the guideways, a plurality of zigzag wire elements connected at one end to the cross member and defining between their ends a common generally horizontally disposed load supporting surface, the other ends of said zigzag wire elements being yieldingly mounted to the frame to yieldably constrain movement of said load supporting surface at said other end relative to the frame, and means disposed below the level of said load supporting surface for adjusting the position of the cross member in said guideways to change the elevation of said load supporting surface adjacent said cross member.

4. A seat support adapted to shift a seat mounted thereon up and down, said seat having a limitedly deformable upper face defined by a row of horizontally disposed wire elements, said seat support comprising in combination transversely spaced apart support brackets adapted to define generally vertically disposed guideways and having wooden bearing surfaces mounted thereto forming one side of the guideways, cross member structure received in the guideways for guided movement, said cross member structure having spaced apart wire anchoring means carried thereby for receiving the wire elements at an attachable end of the latter, and means for adjustably positioning the cross member in the guideways to.

5. A seat support adapted to shift a seat mounted thereon up and down, said seat having a limitedly deformable upper face defined by a row of horizontally disposed wire elements, said seat support comprising in combination transversely spaced apart support brackets adapted to define generally vertically disposed guideways, a cross member structure received in the guideways for guided movement, said cross member structure having spaced apart wire anchoring means carried thereby for receiving the wire elements at an attachable end of the latter, a rockshaft journaled to rotate in bearings supported by means of the support brackets and having a bell crank portion attached thereto for connection to a power operated seat adjusting means, and means including another portion of the bell crank for connecting the rockshaft and the cross member structure for coordinated movement so as to transmit motion from the bell crank for adjusting the position of the cross member structure in the guideways to shift the elevation of the seat.

6. In a spring cushion construction, the combination with a framework of a plurality of parallel spring strips providing a resilient surface and each having end portions bent to form yieldable supports at the front and rear edges of said surface, said yieldable supports being transversely offset in opposite directions from said surface, a sheet metal spring retainer member supported with a sliding guide fit in means on said framework and disposed transversely to the strips at their rear end, spring securing means on the sheet metal member for securing the adjacent yieldable supports thereto so as to cause the strips to be guided in a path at said rear end by movement of the sheet metal member, said framework in the vicinity of the opposite ends of said member carrying fixed track means individual to end structure on said member at that end and slidably mounting the end structures for guided movement in a direction in vertical planes, and a positioning member common to and having separate connections with both of said end structures for coordinating the guided movement of said end structures in concert.

7. In a seat cushion construction, the combination with a framework of a plurality of parallel spring strips providing a resilient horizontal surface and each having end portions bent to form yieldable supports at the opposite edges of the surface, said yieldable supports being transversely offset in opposite directions from said surface, a sheet metal spring retainer member supported with a sliding guided fit in means on said framework and disposed transversely to the strips at one end, securing means mounted to the spring retainer member for securing the adjacent yieldable supports thereto so as to cause the strips to be guided in a path at said end by movement of the spring retainer member, said framework in the vicinity of the opposite ends of said member carrying fixed track means individual to end structure on the spring retainer member at that end and slidably mounting those end structures for guided movement in a direction in vertical planes, and a positioning member common to and having separate connections with both said end structures, said positioning member extending in a direction transverse to said vertical planes operative to coordinate the guided movement of said end structures in concert.

References Cited in the file of this patent

UNITED STATES PATENTS

| | | |
|---|---|---|
| 2,050,420 | Brobst | Aug. 11, 1936 |
| 2,596,033 | King | May 6, 1952 |
| 2,598,421 | Page | May 27, 1952 |
| 2,605,481 | Burkhart | Aug. 5, 1952 |
| 2,740,468 | Gonia et al. | Apr. 3, 1956 |
| 2,775,997 | Kubacka | Jan. 1, 1957 |
| 2,809,688 | Brundage | Oct. 15, 1957 |